(12) United States Patent
Choi et al.

(10) Patent No.: US 6,222,601 B1
(45) Date of Patent: *Apr. 24, 2001

(54) METHOD OF MANUFACTURING A LIQUID CRYSTAL CELL

(75) Inventors: Yoo Jin Choi, Kyungki-do; Jung Ha Kim, Seoul, both of (KR)

(73) Assignee: LG Electronics, Inc., Seoul (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/961,426

(22) Filed: Oct. 30, 1997

(30) Foreign Application Priority Data

Oct. 31, 1996 (KR) .................................. 96-51327

(51) Int. Cl.⁷ .................................. G02F 1/1337
(52) U.S. Cl. .................................. 349/129; 349/124
(58) Field of Search .................................. 349/129, 124, 349/125

(56) References Cited

U.S. PATENT DOCUMENTS

| | | | | |
|---|---|---|---|---|
| 4,323,472 | * | 4/1982 | Sethofer | 349/186 |
| 5,095,378 | * | 3/1992 | Suzuki | 349/179 |
| 5,280,375 | | 1/1994 | Tsuda et al. | 359/76 |
| 5,437,811 | * | 8/1995 | Doane et al. | 349/86 |
| 5,519,523 | * | 5/1996 | Madokoro et al. | 349/181 |
| 5,538,823 | * | 7/1996 | Park et al. | 349/132 |
| 5,546,208 | * | 8/1996 | Shimizu et al. | 349/155 |
| 5,745,206 | * | 4/1998 | Koike et al. | 349/129 |
| 5,793,459 | * | 8/1998 | Toko | 349/191 |

FOREIGN PATENT DOCUMENTS

| | | |
|---|---|---|
| 0 668 527 A2 | 8/1995 | (EP) . |
| 0 768 560 A1 | 4/1997 | (EP) . |
| 3-107925 | 5/1991 | (JP) . |
| WO 97/18495 | 5/1997 | (WO) . |

OTHER PUBLICATIONS

Bahadur, Liquid Crystals: Applications and Uses, vol. 1, pp. 171–188, 1991.*

T. Hashimoto et al., "41:4 TN–LCD with Quartered Sub-pixels Using Polarized UV–Light–Irradiated Polymer Orientation Films", SID 95 Digest, pp. 879–880 (1995).

* cited by examiner

Primary Examiner—James A. Dudek
(74) Attorney, Agent, or Firm—Morgan, Lewis & Bockius LLP

(57) ABSTRACT

A method of manufacturing a liquid crystal cell in accordance with the present invention comprises the steps of forming a first alignment layer and a second alignment layer on a first substrate and a second substrate, forming a pretilt having an alignment, pretilt angle direction, and pretilt angle of the first alignment layer, forming a liquid crystal layer between the first substrate and second substrate after sealing them.

17 Claims, 15 Drawing Sheets

PRIOR ART

FIGURE 3b

PRIOR ART

FIGURE 3c

PRIOR ART

FIGURE 4
PRIOR ART

RUBBING I | RUBBING II

FIGURE 5
PRIOR ART

SMALL PRETILT DOMAIN I | LARGE PRETILT DOMAIN II

FIGURE 6a

PRIOR ART

FIGURE 6b

PRIOR ART

FIGURE 6c

PRIOR ART

FIGURE 6d

PRIOR ART

FIGURE 6e

PRIOR ART

METHOD OF MANUFACTURING A LIQUID CRYSTAL CELL

BACKGROUND OF THE INVENTION

The present invention relates to a method of manufacturing liquid crystal cell, and more particularly to a simplified method of manufacturing the wide viewing angle liquid crystal cell.

A liquid crystal display device(LCD) which records and processes an optical information basically comprises two substrates, and a liquid crystal between them. In the LCD, it is essential to arrange a liquid crystal director to obtain uniform brightness and high contrast ratio.

Direction of the liquid crystal director is controlled by a variety of process after an alignment layer is formed by depositing polymer on the substrate.

Figure 1:
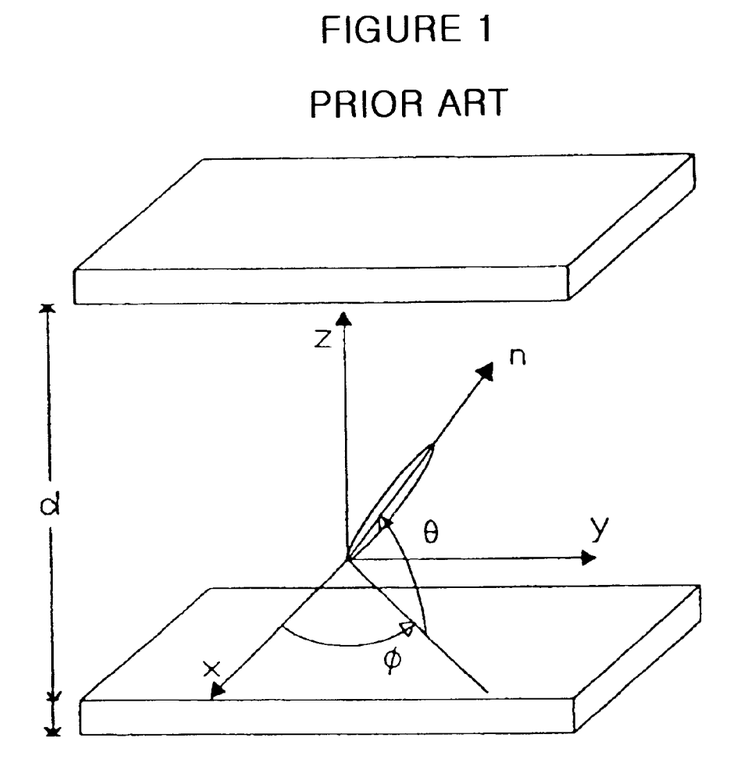
FIG. 1 is a drawing showing a coordinate n of the nematic liquid crystal director in cartesian coordinates.

Namely, a coordinate $\vec{n}$ of the nematic liquid crystal director in cartesian coordinate of FIG. 1 is controlled by determining an alignment direction $\theta$ and a pretilt angle $\phi$ on the alignment layer as follows.

$\vec{n}=(\cos\theta\cos\phi, \cos\theta\cos\phi, \sin\theta)$

Recently LCDs used in potable televisions or notebook computers require large size. A twisted nematic liquid crystal display(TN-LCD) has a narrow viewing angle ie., the transmittance in each grey level depends on the viewing angle. This viewing angle dependence, specially, is very strong in the up and down directions. This angular dependence in the up and down directions is caused by the electrically induced liquid crystal(LC) director configuration.

Figure 2:
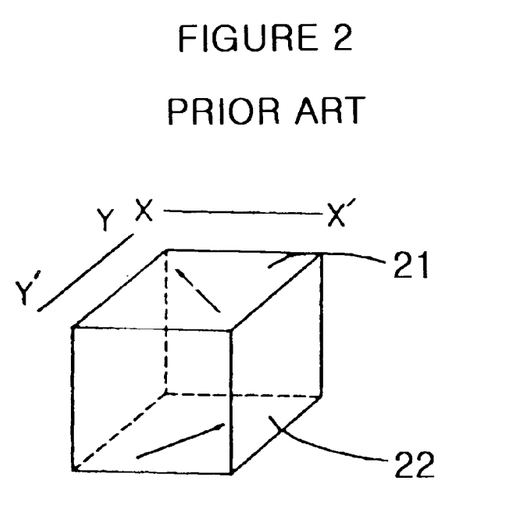
FIG. 2 is a sectional view of the twisted nematic liquid crystal cell.

FIG. 2 is drawing showing a structure of the liquid crystal cell having the alignment restricting power, liquid crystal molecules are twisted to right-handed direction by that.

The TN-LC cell is characterized in that the transmittance in each grey level depends on the viewing angle.

Figure 3A:
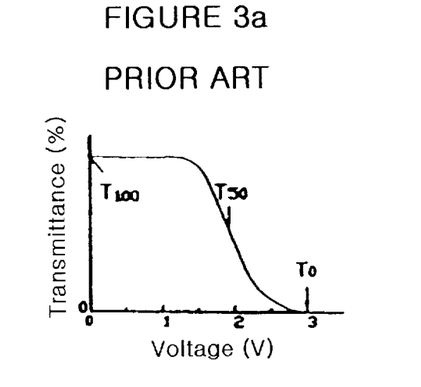
FIG. 3a is a graph showing a relationship between transmittance and voltage.
Figure 3B:
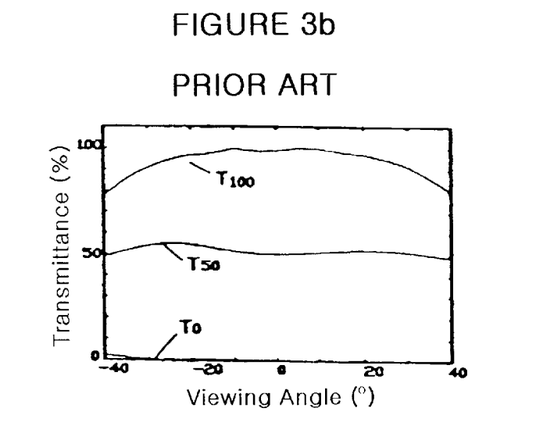
FIG. 3b is a graph showing a relationship between transmittance and viewing angle in right-left direction.
Figure 3C:
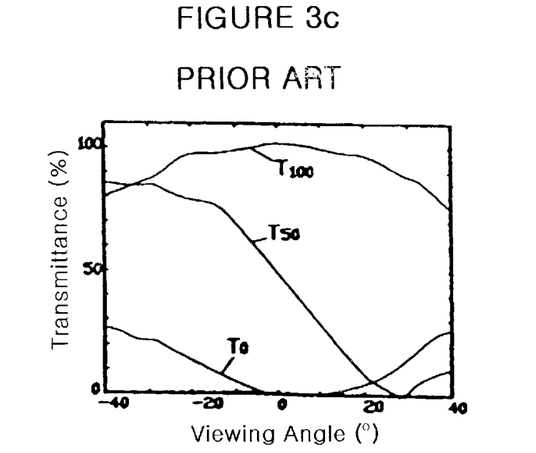
FIG. 3c is a graph showing a relationship between transmittance and viewing angle in up-down direction.

FIG. 3a is a graph showing a relationship between transmittance and voltage, FIG. 3b is a graph showing a relationship between transmittance and viewing angle in X–X' direction(right-left direction) of FIG. 2, and FIG. 3c is a graph showing a relationship between transmittance and viewing angle in Y–Y'(up-down direction) direction of FIG. 2.

As shown in FIGS. 3a through 3c, while the transmittance in X–X' direction is symmetrically distributed, the transmittance in Y–Y' direction is asymmetrically distributed as a result, the wide viewing angle can not be achieved by the gray inversion in Y–Y' direction.

Figure 4:
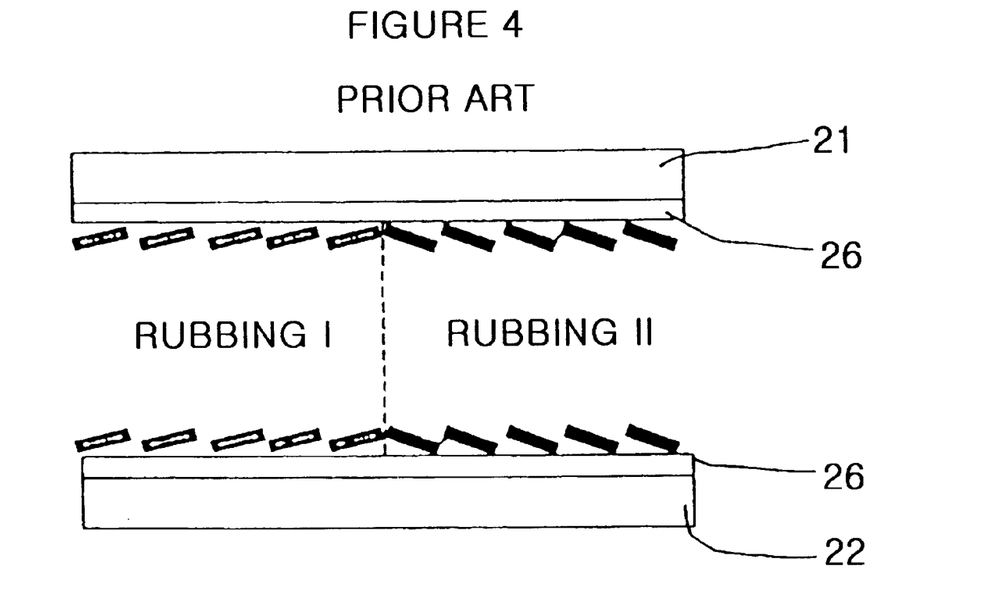
FIG. 4 is a drawing showing a structure of a two-domain TN-LCD.
Figure 5:
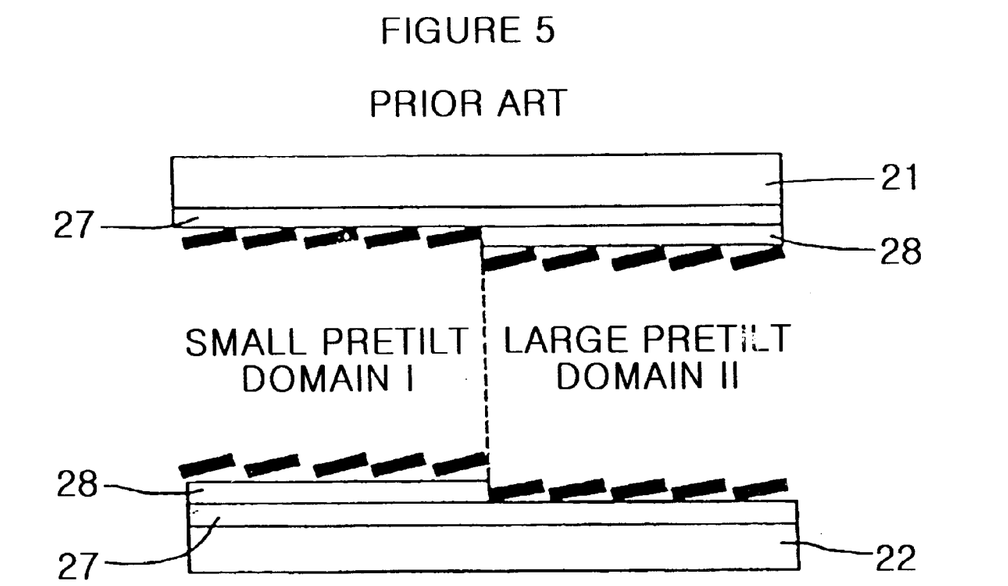
FIG. 5 is a drawing showing a structure of a domain divided TN-LCD.

To solve the above discussed problem, a multi-domain LCD has been introduced as shown in FIG. 4 and FIG. 5.

FIG. 4 a drawing showing a structure of a two-domain TN LCD(TDTN LCD). Two alignments 26 having a plurality of pretilt angles is formed on each substrate 21, 22. When a voltage is applied to the cell, each of the liquid crystal directors is located at opposite directions as a result, the transmittance is compensated and the wide viewing angle is achieved.

Further, FIG. 5 is a drawing showing a structure of a domain divided TN-LCD(DDTN LCD). A first alignment layer 27 and a second alignment layer 28 are formed on two substrates 21, 22, each alignment layer may be organic or inorganic alignment layer. Here, each alignment layer has a different pretilt angle to divide a domain in a single pixel, thereby the wide viewing angle is achieved.

In addition, a four-domain TN LCD using the pixel dividing method provides a improved viewing angle characteristic.

An inverse direction rubbing method as shown in FIGS. 6a through 6e have commonly been used to obtain the multi-domain LC cell.

Figure 6A:
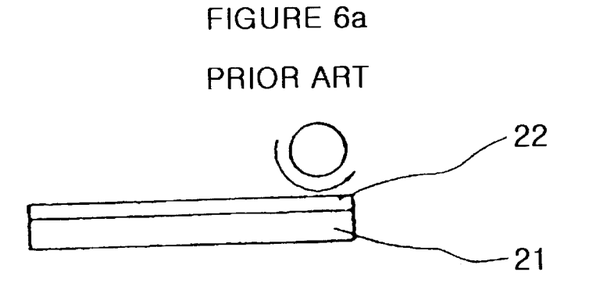
FIGS. 6a through 6e represent a inverse rubbing process to obtain a two-domain pretilt.
Figure 6B:
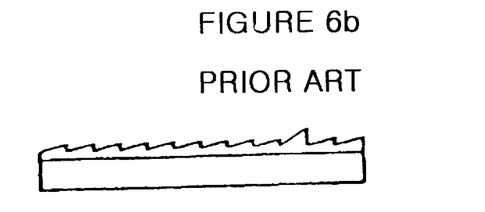
Figure 6C:
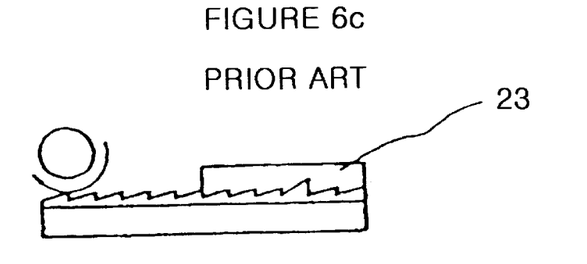
Figure 6D:
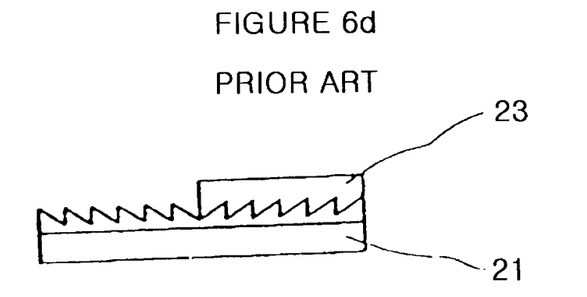
Figure 6E:
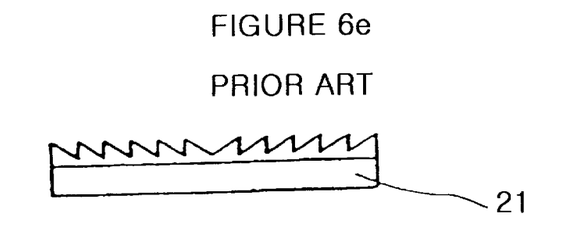

Firstly, a mono-domain is completed as shown in FIG. 6b by rubbing a substrate 21 on which a polyimide 22 is deposited as shown in FIG. 6a. After blocking the domain with a photoresist 23 as shown in FIG. 6c, rubbing is executed in the opposite direction to form the opposite alignment direction as shown in FIG. 6d. Further the photoresist 23 is removed. As a result, as shown in FIG. 6e, the substrate 21 is divided into two domains wherein each domain has a different pretilt angle.

Figure 7D:
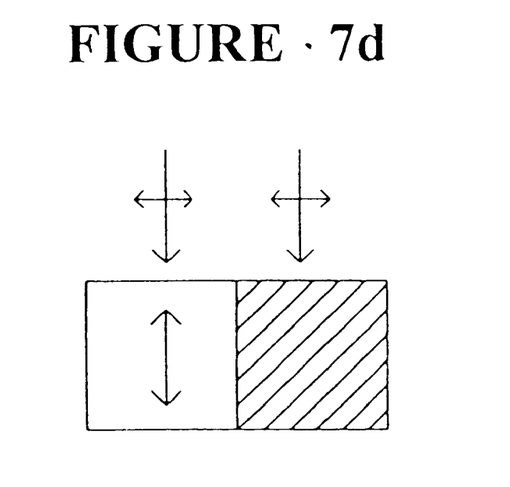
Figure 7E:
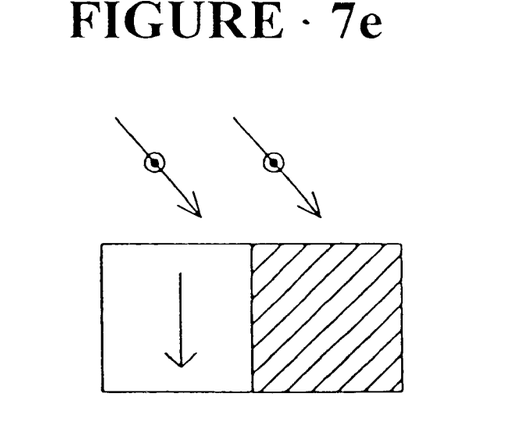
Figure 7F:
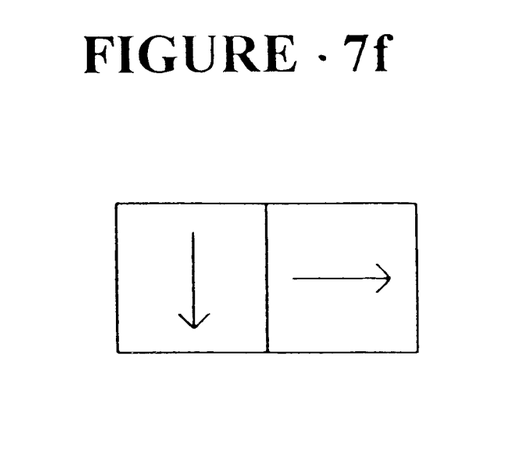

In addition, FIGS. 7a through 7f represent a photo-alignment method. Firstly, a first alignment direction is decided by vertically irradiating the linearly polarized light having a first polarization direction on a photo alignment material-coated substrate as shown in FIG. 7a. A first pretilt angle is decided by inclined irradiation of the linearly polarized light as shown in FIG. 7b. After removing a mask to decide a pretilt angle direction of the blocked domain in FIG. 7a, the domain having the first pretilt angle is blocked with a mask. A second alignment direction is decided by vertically irradiating the light having vertical polarization direction against the first polarization direction as shown in FIG. 7d. A second pretilt angle is decided by inclined irradiation of the linearly polarized light to decide a pretilt angle direction in the second alignment direction. When the photoresist is removed, it is possible to provide a two-domain divided substrate as shown in FIG. 7f.

In the related art, however, a plurality of complex processes are required. Also in order to provide the four-domain LC cell, double process are required. Namely, in the alignment process of a multi-domain cell such as a two-domain cell, however, since eight exposure processes and four masking processes are needed, the overall process is complicated with an increased cost.

SUMMARY OF THE INVENTION

An object of the present invention is to provide a method of manufacturing a wide viewing angle liquid crystal cell in which the LC cell is formed by that after forming a pretilt including an alignment direction, a pretilt angle direction, and pretilt angle on a first substrate, then a LC layer is formed between the first substrate and a second substrate without processing a pretilt on the second substrate.

An other object of the present invention is to apply the above-discussed method to a four-domain LC cell.

In order to achieve this object, the manufacturing method of the present invention comprises the steps of forming a first alignment layer and a second alignment layer on a first substrate and a second substrate, forming a pretilt including an alignment direction, a pretilt angle direction, and pretilt angle on an alignment layer of the first substrate, and forming a liquid crystal layer between the first substrate and second substrate. By this method, it is possible to provide the LC cell without processing the pretilt on the second substrate by alignment controlling force of the pretilt on the first substrate.

A multi-domain LC cell applied to the above method comprises the steps of a first alignment layer and a second alignment layer on a first substrate and a second substrate, forming a multi-domain pretilt on an alignment layer of the first substrate, and forming a liquid crystal layer between the first substrate and second substrate. By this method, it is possible to provide the LC cell without processing the pretilt on the second substrate by alignment controlling force of the pretilt on the first substrate.

In accordance with the present invention, it is possible to provide the LC cell without processing the pretilt on the second substrate by alignment controlling force of the pretilt on the first substrate, or by twist force of chiral dopants of the chiral dopants-included LC. As a result, manufacturing process is reduced to ½. Further in multi-domain LC cell according to the present invention, it is possible to provide the multi-domain LC cell without processing the multi pretilt on the second substrate by alignment controlling force of the multi pretilt on the first substrate, or by twist force of chiral dopants of the chiral dopants-included LC. As a result, manufacturing process is reduced to ½.

In the above-discussed method, many alignment processing methods such as the photo alignment method, the rubbing method, and the oblique deposition method may be applied. Also the chiral dopants may be right-handed or left-handed, and its with a weight is preferably about 0.1–0.5% of LC weight.

BRIEF DESCRIPTION OF THE DRAWINGS

FIGS. 3a through 3e one drawings showing a characteristics of the twisted nematic liquid crystal cell specifically.

FIGS. 7a through 7f represent a photo alignment process to obtain a two-domain pretilt.

FIGS. 8a through 8f represent a photo alignment process for TN LC cell in accordance with the present invention.

DETAILED DESCRIPTION OF THE INVENTION

Reference will now be made in detail to the present preferred embodiments of the invention, a method of controlling an alignment direction of a multi-domain LC cell of which are illustrated in the accompanying drawings.

FIG. 8 is a drawing showing a photo alignment process in accordance with the present invention.

Figure 8A:
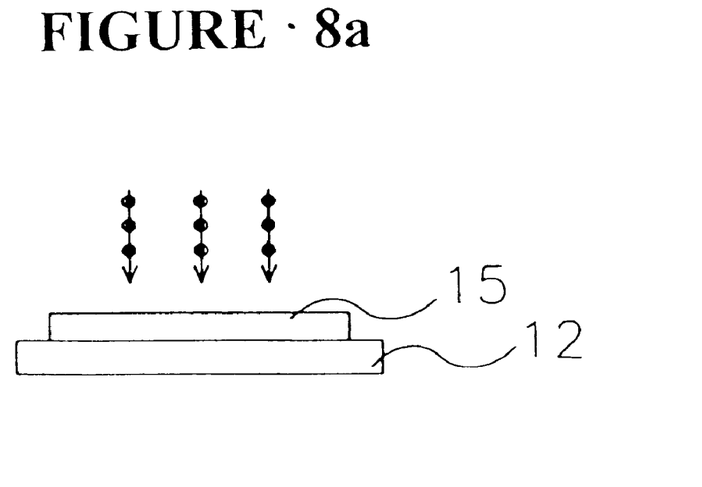
Figure 8B:
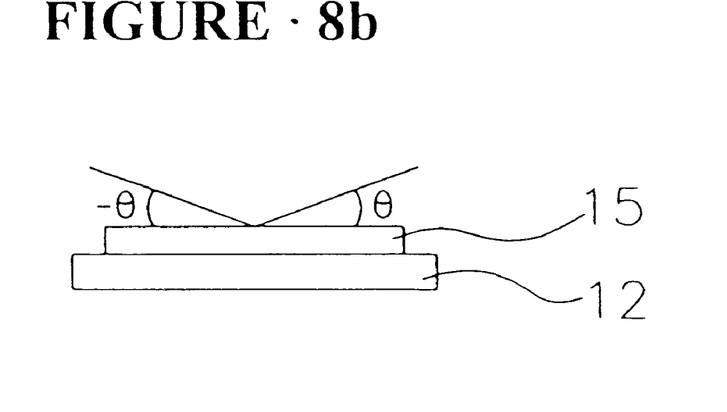
Figure 8C:
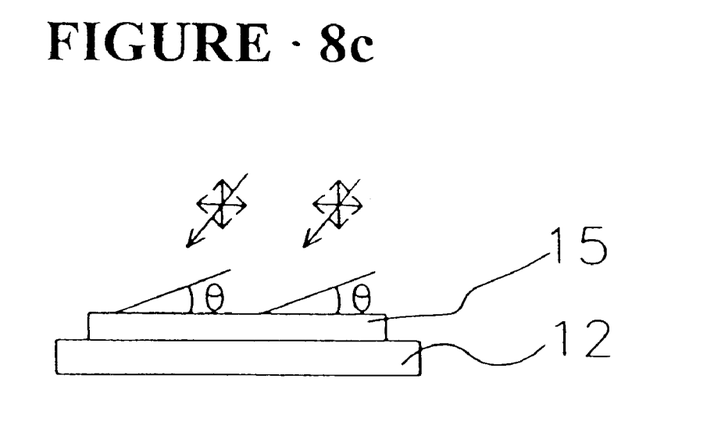
Figure 8D:
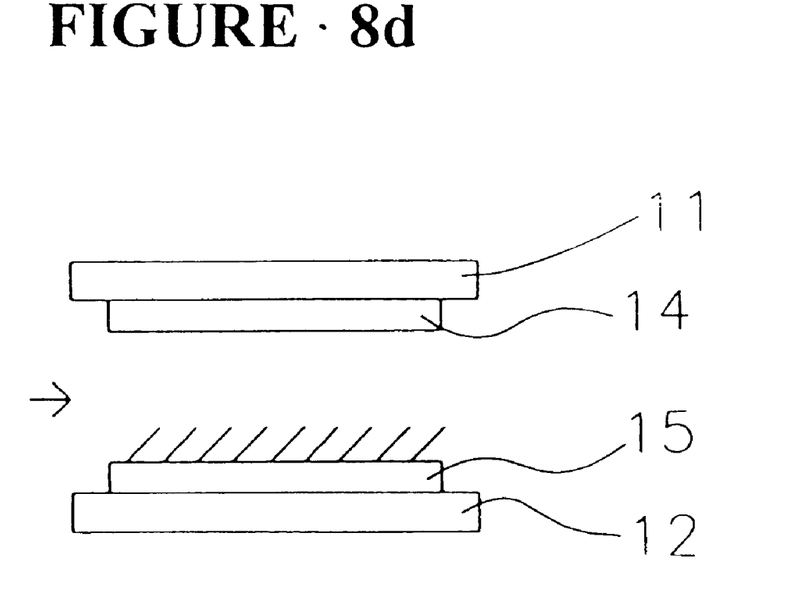

Firstly, a pretilt having two pretilt angle directions θ, −θ as shown in FIG. 8b is determined by vertically irradiating the linearly polarized light on a photo alignment layer 15 formed on a second substrate 12 as shown in FIG. 8a. Further, a first pretilt is determined as one pretilt angle direction θ by inclined irradiation of the linearly polarized light as shown in FIG. 8c. The LC 13 including chiral dopants is injected between the second substrate 12 having the first pretilt and the first substrate 11 having the first alignment layer 14 as shown in FIG. 8d.

Figure 8E:
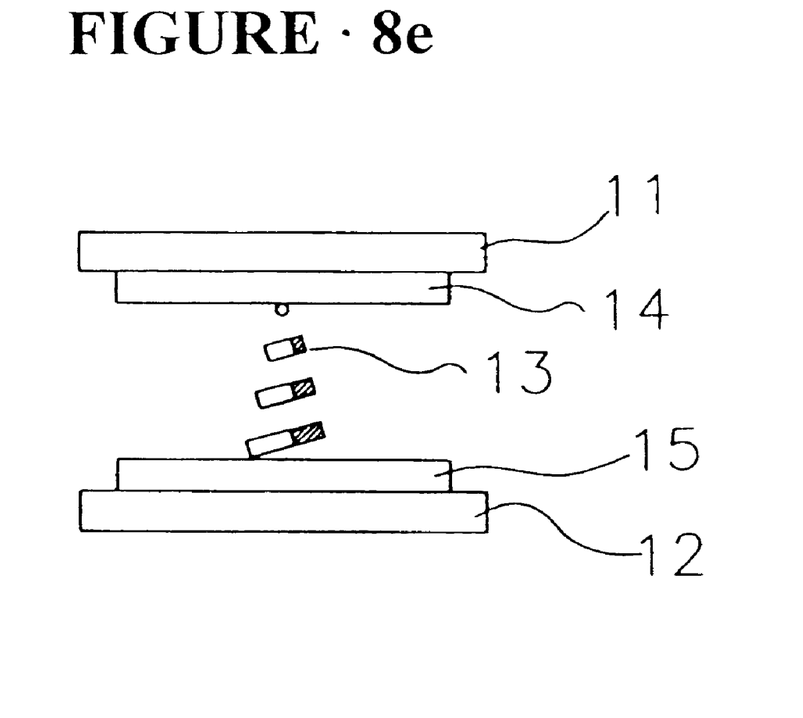
Figure 9A:
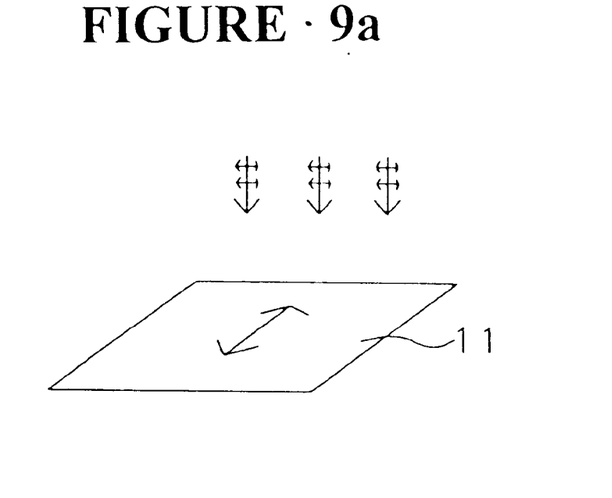
FIGS. 9a through 9f represent a photo alignment process for two-domain TN LC cell in accordance with the present invention.
Figure 9B:
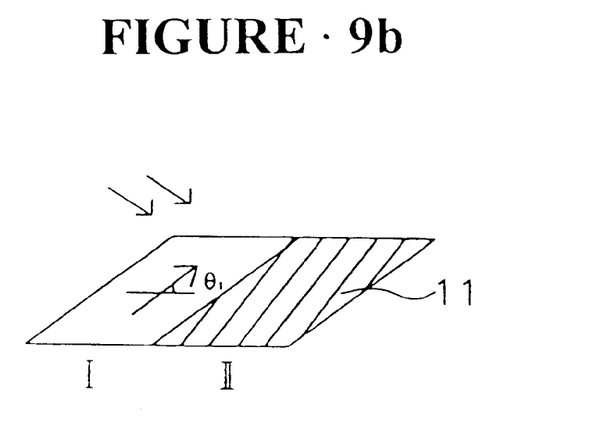
Figure 9C:
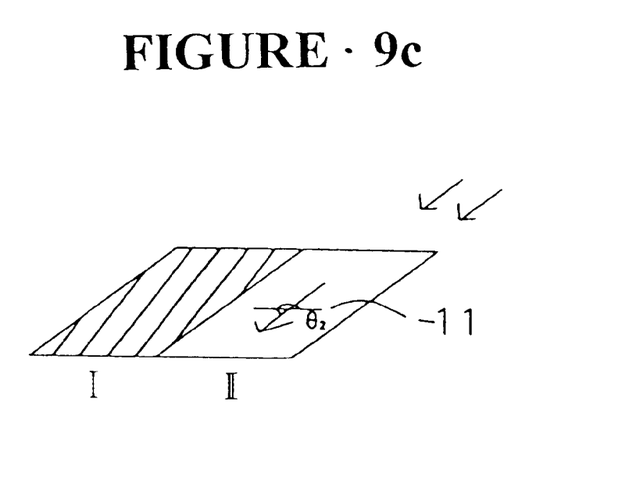
Figure 9D:
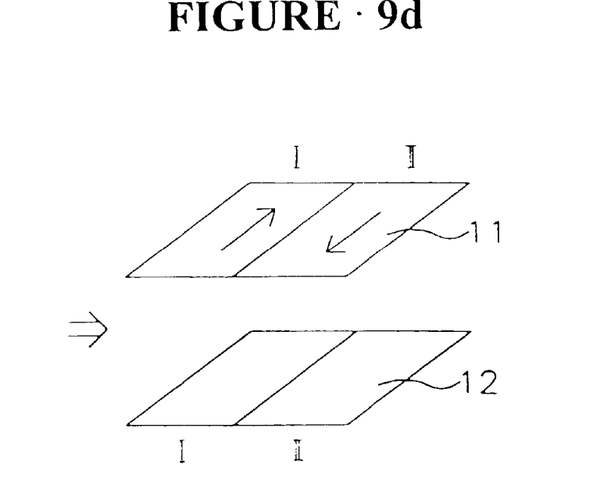
Figure 9E:
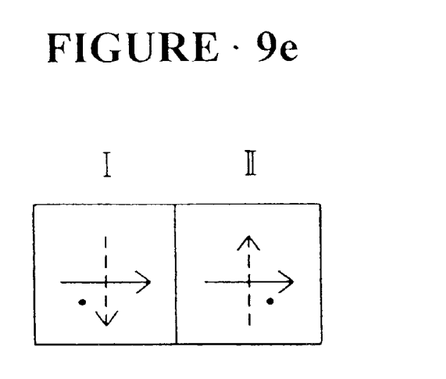
Figure 9F:
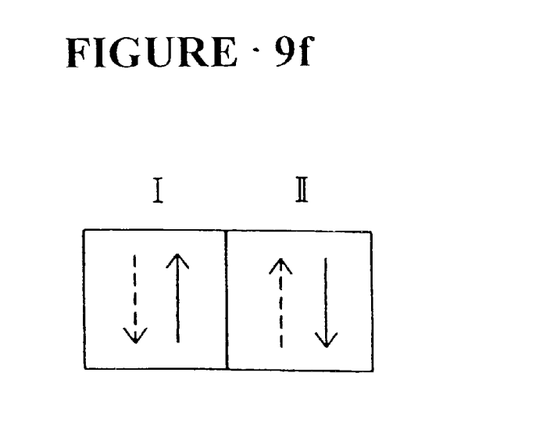

In the above-discussed method, it is possible to provide the LC cell as shown in FIG. 8e because a pretilt of the first substrate 11 is determined by alignment controlling force of the first pretilt on the second substrate 12 and twist force of chiral dopants. If dopant-less LC is injected between them, parallel alignment LC cell is achieved as shown in FIG. 8f.

FIG. 9 is a drawing showing a manufacturing process for two-domain TN LC cell by photo alignment method as shown in FIG. 8. Here, solid line arrows represent an alignment direction of the first substrate 11, dotted line arrows represent an alignment direction of the second substrate 12, and points represent a main viewing angle direction in FIG. 9e. Firstly, a perpendicular alignment direction to a polarizing direction of being irradiated light on the first substrate is determined, in which the alignment direction comprises pretilt angle directions $\theta_1$, $\theta_2$ as shown in FIG. 9a. To form two-domains on the substrate having the alignment direction, one pretilt angle direction $\theta_1$ is determined by inclined irradiation of the linearly polarized light on a first domain I after blocking a second domain II as shown in FIG. 9b, thereby determining a first pretilt of the first domain I. In FIG. 9c, the first substrate 11 is divided into two domains by determining a pretilt angle direction $\theta_2$ against 180° for the first pretilt of the second domain, wherein a pretilt angle direction is not determined, in a state that the first domain having the first pretilt is blocked with the mask after removing the mask of FIG. 9b and the mask is removed. FIG. 9d represents the step of injecting LC and chiral dopants between the first substrate 11 and the second substrate 12 after sealing them. Further, a first domain I and a second domain II of the substrate 12 is determined in state that its left rotating of 90° to the first substrate 11 by alignment controlling force of the first and second pretilts on the first substrate and a twist force of left-handed chiral dopants as shown in FIG. 9e. At this time, the main viewing angle directions formed by above-discussed method are located in opposing directions, thereby achieving wide viewing angle characteristics. The weight of chiral dopants is preferably about 0.1–0.5% of LC weight. If dopant-less LC is injected between them, a LC cell is achieved as shown in FIG. 9f.

By the LC cell made of above-discussed method, since the pretilt of the second substrate is determined by two pretilts of the first substrate without any alignment steps, the number of manufacturing process is reduced as well as the cost.

In the above-discussed method, many alignment processing methods such as the photo alignment method, the rubbing method, and the oblique deposition method may be applied.

FIG. 10 represent a manufacturing process using a rubbing method instead of photo alignment method. Here, solid line arrows represent the alignment direction of the first substrate 11, dotted line arrows represent the alignment direction of the second substrate 12, and points represent the main viewing angle direction in FIG. 10c.

Figure 10A:
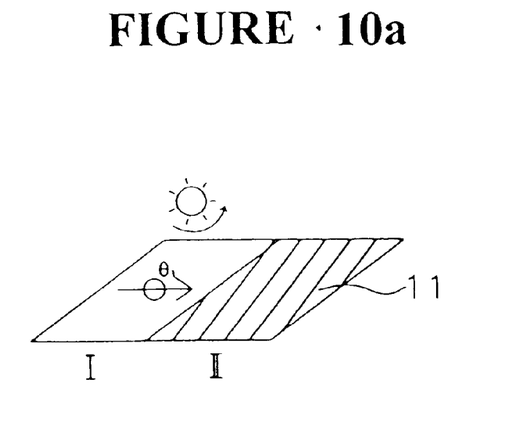
FIGS. 10a through 10e represent a rubbing process for two-domain TN LC cell in accordance with the present invention.
Figure 10B:
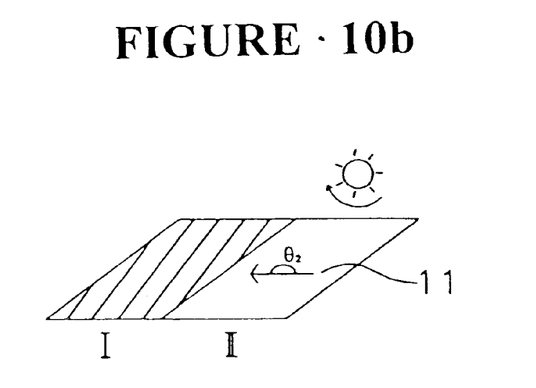
Figure 10C:
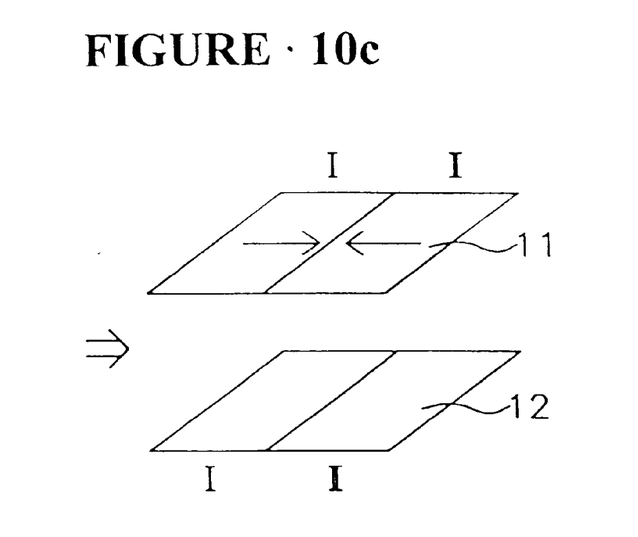
Figure 10D:
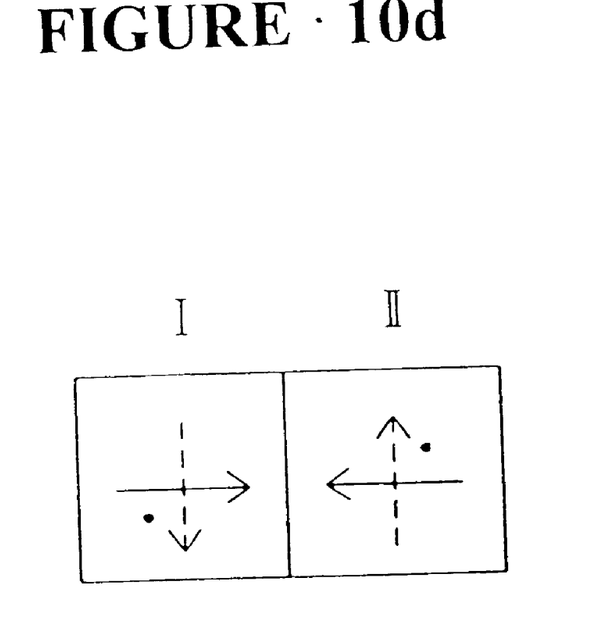
Figure 10E:
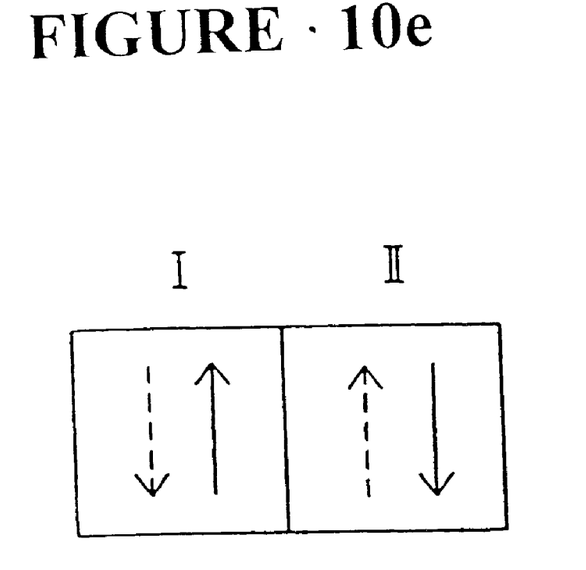

As shown in FIG. 10a, the first pretilt $\theta_1$ is determined by a first rubbing the second domain II blocked with the mask to determine the first domain I of the first substrate 11. Further, as shown in FIG. 10b, the second pretilt $\theta_2$ is determined by an opposing rubbing the first domain I blocked with the mask to determine the second domain II of the first substrate 11. After determining the pretilts of the two domains of the first substrate 11, as shown in FIG. 10c, if LC and chiral dopants are injected between the first substrate 11 and the second substrate 12 after sealing them, a first domain I and a second domain II of the substrate 12 is determined by alignment controlling force of the first and second pretilts on the first substrate and a twist force of chiral dopants. At this time, the main viewing angle directions formed by above-discussed method are located in opposing directions, thereby achieving wide viewing angle characteristics. The weight of chiral dopants is preferably about 0.1–0.5% of LC weight. If dopant-less LC is injected between them, a LC cell is achieved as shown in FIG. 10e.

By the LC cell made of above-discussed method, since the pretilt of the second substrate is determined by two pretilts of the first substrate without any alignment process, the number of manufacturing process is reduced as is the cost.

In the above-discussed method, many alignment processing methods such as the photo alignment method, the rubbing method, and the oblique deposition method may be applied.

Figure 11A:
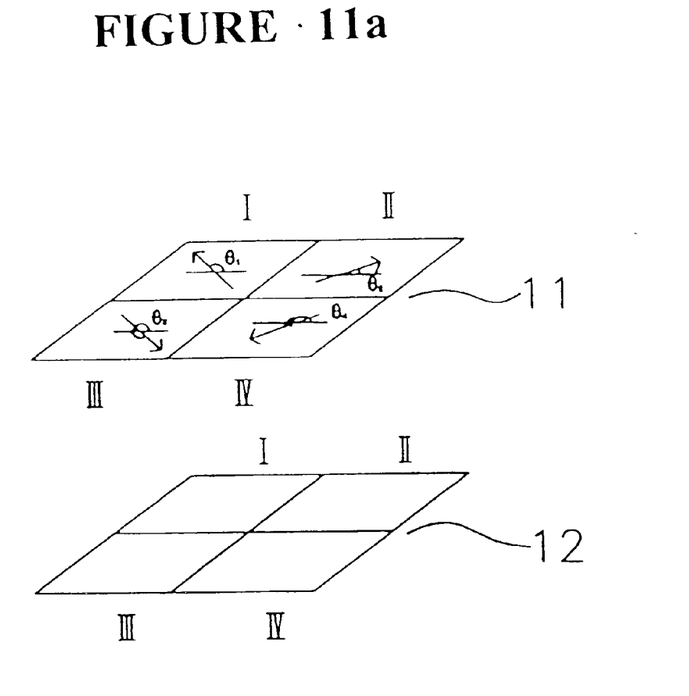
FIGS. 11a through 11c represent a manufacturing process for four-domain LC cell of one embodiment in accordance with the present invention.
Figure 11B:
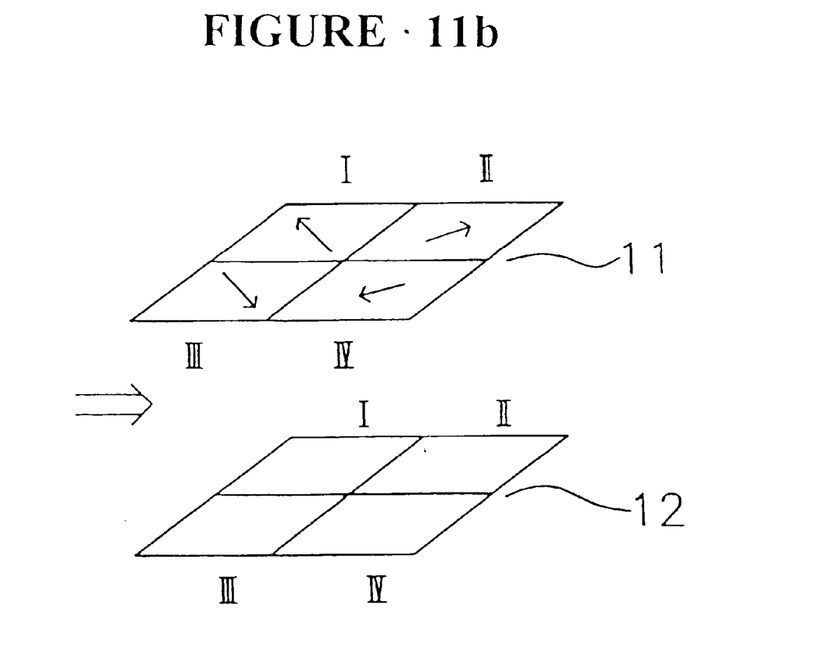
Figure 11C:
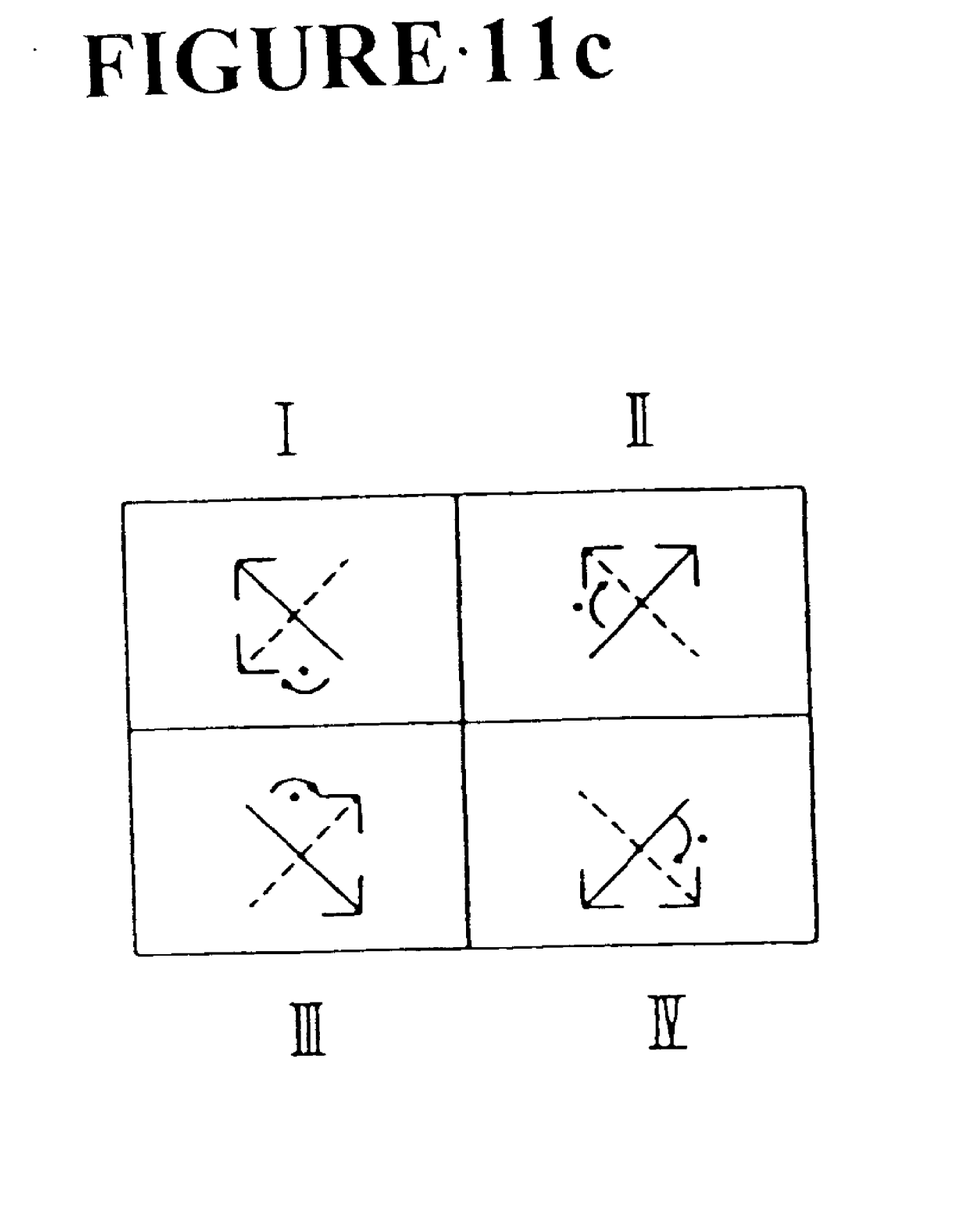

FIG. 11 represents a manufacturing process for four-domain LC cell by the photo alignment method. Here, solid line arrows represent the alignment direction of the first substrate 11, dotted line arrows represent the alignment direction of the second substrate 12, and points represent the main viewing angle direction in FIG. 11c. In addition, as shown in FIG. 11a, pretilts of $\theta_1$, $\theta_2$, $\theta_3$, and $\theta_4$ of a first domain I, second II, third domain III, and fourth domain IV of the first substrate 11 are determined by the method FIG. 9 and FIG. 10. If LC and chiral dopants is injected between the first substrate 11 and the second substrate 12 after sealing them, the first domain I, the second domain II, the third domain III, and the fourth domain IV of the substrate 12 is determined by alignment controlling force of the pretilts on the first substrate and a twist force of chiral dopants.

At this time, the main viewing angle directions formed by above-discussed method are located in opposing direction, thereby achieving wide viewing angle characteristics is achieved. The weight of chiral dopants is preferably about 0.1–0.5% of LC weight. If dopant-less LC is injected between them, a LC cell is achieved as shown in FIG. 11c.

By the LC cell made with the above-discussed method, since the four pretilts of the second substrate is determined by the pretilts of the first substrate without any alignment process, the number of manufacturing process is reduced as well as the cost.

In the above-discussed method, many alignment processing methods such as the photo alignment method, the rubbing method, and the oblique deposition method may be applied.

Since the pretilt of the substrate is determined by an alignment controlling force of the pretilts on the first substrate or a twist force of chiral dopants, it is possible to reduce the manufacturing process to ½.

Further, it is possible to form the multi-domain LC cell by using the above-discussed method.

While the preferred form of the present invention has been described, it is to be understood that modifications will be apparent to those skilled in the art without departing from the spirit of the invention.

The scope of the invention, therefore, is to be determined solely by the following claims.

What is claimed is:

1. A method of manufacturing a liquid crystal cell, the method comprising the steps of:
   forming a first alignment layer on a first substrate;
   forming a pretilt on the first alignment layer by a photo-alignment method, the pretilt including a pretilt angle and a pretilt angle direction;
   forming a second alignment layer on a second substrate, the second alignment layer being non-alignment-treated; and
   forming a liquid crystal layer between the first substrate and the second substrate, the liquid crystal layer including substantially 0.1–0.5 percentage by weight of chiral dopants of a liquid crystal in the liquid crystal layer,
   wherein a pretilt of the liquid crystal at the second alignment layer is determined by an alignment controlling force of the pretilt on the first alignment layer and a twisting force of the chiral dopants.

2. The method according to claim 1, wherein the photo-alignment method uses linearly polarized light to form the pretilt.

3. The method according to claim 1, wherein the first alignment layer includes polysiloxane based materials.

4. The method according to claim 1, wherein the first alignment layer includes polyvinylfluorocinnamate.

5. The method according to claim 1, wherein the chiral dopants include right-handed chiral dopants.

6. The method according to claim 1, wherein the chiral dopants include left-handed chiral dopants.

7. The method according to claim 1, wherein a liquid crystal in the liquid crystal layer is aligned by a twisting force according to an amount of chiral dopants in the liquid crystal layer.

8. A method of manufacturing a liquid crystal cell, the method comprising the steps of:
   forming a first alignment layer on a first substrate;
   forming a first pretilt on a first region of the first alignment layer by a photo-alignment method, the first pretilt including a pretilt angle and a pretilt angle direction;
   forming a second pretilt on a second region of the first alignment layer by a photo-alignment method, the second pretilt including a pretilt angle and a pretilt angle direction;
   forming a second alignment layer on a second substrate, the second alignment layer being non-alignment-treated; and
   forming a liquid crystal layer between the first substrate and the second substrate, the liquid crystal layer including substantially 0.1–0.5 percentage by weight of chiral dopants of a liquid crystal in the liquid crystal layer,
   wherein a pretilt of the liquid crystal at the second alignment layer is determined by an alignment controlling force of the first and second pretilts on the first alignment layer and a twisting force of the chiral dopants.

9. The method according to claim 8, wherein the photo-alignment method of the step of forming a first pretilt on a first region of the first alignment layer and the photo-alignment method of the step of forming a second pretilt on a second region of the first alignment layer each use linearly polarized light to respectively form the first and second pretilts.

10. The method according to claim 1, wherein the first alignment layer includes polysiloxane based materials.

11. The method according to claim 1, wherein the first alignment layer includes polyvinylfluorocinnamate.

12. The method according to claim 8, wherein the first and second regions of the first alignment layer are defined by using a mask.

13. The method according to claim 8, wherein the chiral dopants include right-handed chiral dopants.

14. The method according to claim 8, wherein the chiral dopants include left-handed chiral dopants.

15. The method according to claim 1, further comprising the step of providing an optical compensation film over at least one of the first substrate and the second substrate.

16. The method according to claim 8, further comprising the step of providing an optical compensation film over at least one of the first substrate and the second substrate.

17. The method according to claim 8, wherein a liquid crystal in the liquid crystal layer is aligned by a twisting force according to an amount of chiral dopants in the liquid crystal layer.

* * * * *